Nov. 26, 1929.  E. A. EXTON  1,737,228

INDUSTRIAL CAR WHEEL

Filed Aug. 25, 1927

INVENTOR

Edward A. Exton,
By Byrnes, Stebbins & Parmelee,
His attorneys.

Patented Nov. 26, 1929

1,737,228

UNITED STATES PATENT OFFICE

EDWARD A. EXTON, OF IRWIN, PENNSYLVANIA, ASSIGNOR TO IRWIN FOUNDRY AND MINE CAR COMPANY, OF IRWIN, PENNSYLVANIA, A CORPORATION OF PENNSYLVANIA

INDUSTRIAL CAR WHEEL

Application filed August 25, 1927. Serial No. 215,328.

My invention relates to the construction of wheels used for industrial cars.

In the manufacture of wheels for industrial cars, such as mine cars, pit cars and the like, the wheel is generally cast as a unit, an opening for the axle is machined therein, the axle inserted through the opening and the wheel is free to turn on the axle. Such cars are subjected to very rough usage and are frequently left exposed to the weather for considerable lengths of time. For these reasons, the lubrication of the axles is an important consideration in the manufacture of such wheels.

The application of roller bearings to industrial wheel constructions has necessitated greater care in the lubrication of the wheels. Elaborate systems for forcing lubricating oils and greases into the wheel openings have heretofore been proposed. Such constructions require the addition of a pipe connection and an external nipple or valve through which the lubricant may be forced. By reason of the rough service to which such cars are subjected, external lubricating devices are liable to injury and also add materially to the cost of such wheels. It has also been proposed to construct elaborate devices for inserting lubricant directly through the opening in the hub cap. Such constructions have heretofore required the formation of threads on the face of the wheel hub and on the face of the cap.

I provide a wheel hub in which bearings are mounted for cooperation with the shaft, and form a shoulder along the outer edge of the hub opening. A cap of dish shape, having a snug fit with the face of the opening is slidably inserted into the opening and secured in place by a clamping ring. The fit between the surface of the opening and the cap is sufficiently snug to substantially prevent the loss of lubricant, while at the same time permitting the cap to be withdrawn and inserted by a manual operation. With this construction, a quantity of lubricant is inserted into the hub opening periodically and the cap is then secured in position. This construction eliminates the necessity for any external projecting oiling devices and removes the necessity for forming threads in the hub for securing such devices in place.

The accompanying drawings illustrate the present preferred embodiment of the invention in which Fig. 1 is a view partially in elevation and partially in section of a wheel embodying my invention;

Figure 1:
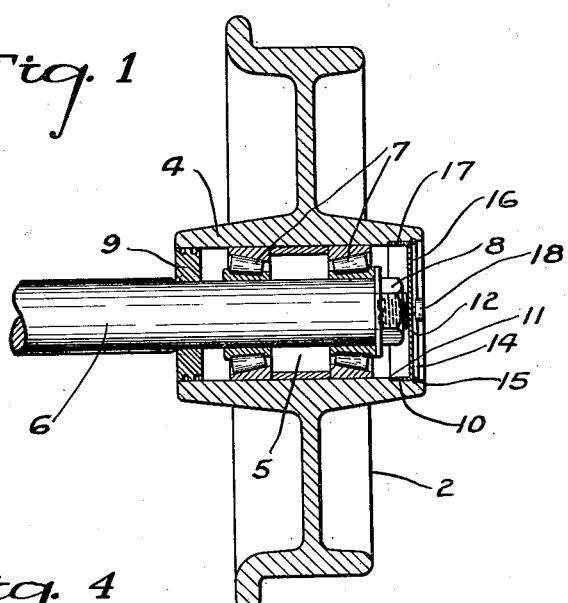

Referring to Fig. 1, a wheel 2 having a flange 3 and hub 4 is provided with an opening 5 in the hub for the reception of a shaft 6 and bearings 7. The wheel 2 is here illustrated as a cast wheel, although it is to be understood that the invention is applicable to all types of wheels enclosing the end of a shaft. The bearings 7 are illustrated as roller bearings secured in place by a nut 8 threaded to the end of the shaft 6. It is to be understood that the showing of the particular type of bearings is for the purpose of illustration only, as the invention is applicable to other types of bearings. The inner end of the opening 5 is partially closed by a collar 9 shrunk onto axle 6 and having rotatable engagement with the inner surface of hub 4. The outer end of the opening 5 is provided with a machined seat 10 defining a shoulder 11. Cap 12 is secured by an expansible securing ring 14 seated in a groove 15 in the hub 4.

Figure 2:
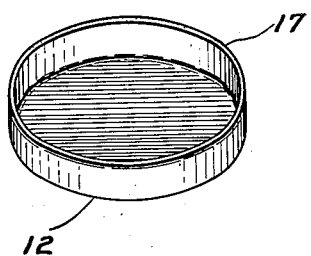
Fig. 2 is a perspective view of the wheel cap.

Referring to Fig. 2, cap 12 is of a dish shape, having a substantially flat end portion 16 and an edge portion 17 extending at substantially right angles thereto for defining an external cylindrical surface. Portion 17 is adapted to have a snug fit with the seat 10 in the hub 4 for preventing the loss of lubricant. However, the fit is loose enough to permit the cap 12 to be removed by manual operation. A handle 18 may project from the portion 16. The cap 12 may be formed by a stamping operation and when so formed, requires substantially no subsequent machining.

Figure 3:
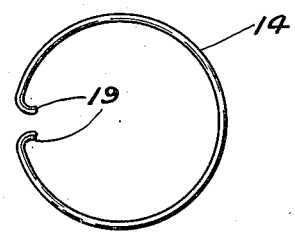
Fig. 3 is a face view of a securing ring.

Referring to Fig. 3, the clamping ring 14 is provided with inturned ends 19 to provide an opening for permitting the expansion and contraction of the ring as desired.

Figure 4:
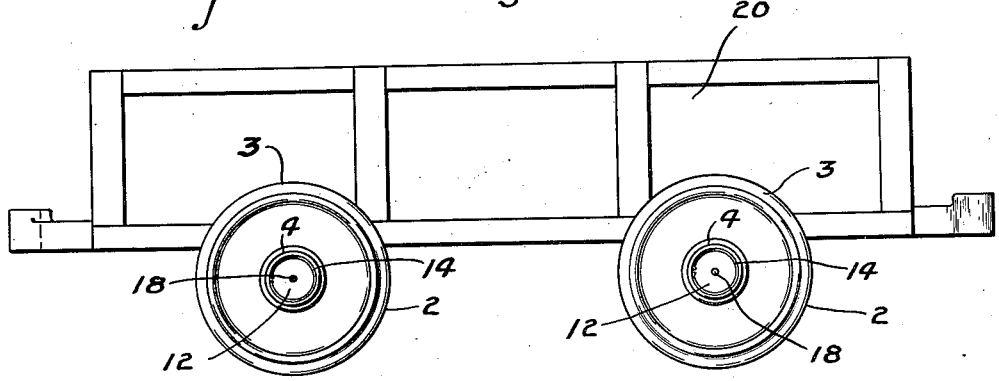
Fig. 4 is an elevational view of an industrial car equipped with wheels embodying the present invention.

Referring to Fig. 4, the wheels 2 are illustrated as applied to the body of a mine car 20, although it is to be understood that the wheels may be used with any type of industrial car.

It is to be understood that various changes may be made in the invention without departing from the scope of the appended claims.

I claim:

1. In a wheel structure, a wheel hub having an opening therethru terminating in a recessed portion defining a shoulder, a cap of dish shape having a cylindrical wall slidably insertable into the opening with its end in abutment with the shoulder and its wall in substantially lubricant tight engagement with the surface of the recess, and retaining means for the cap.

2. In a wheel structure, a wheel hub having an opening therethru terminating in a recessed portion defining a shoulder, a cap of dish shape having a stamp finished wall slidably insertable into the opening with its end in abutment with the shoulder and its wall in substantially lubricant tight engagement with the surface of the recess, and retaining means for the cap comprising an expansible ring seated in a groove externally of the cap.

In testimony whereof I have hereunto set my hand.

EDWARD A. EXTON.